United States Patent [19]

Baldwin

[11] Patent Number: 4,492,887
[45] Date of Patent: Jan. 8, 1985

[54] COMPACT RESISTOR ASSEMBLY FOR ROTARY ELECTRIC MACHINE

[75] Inventor: Jeffrey D. Baldwin, Rockford, Ill.

[73] Assignee: Sundstrand Corporation, Rockford, Ill.

[21] Appl. No.: 526,341

[22] Filed: Aug. 25, 1983

[51] Int. Cl.³ .................. H02K 11/00; H01C 3/18
[52] U.S. Cl. .................. 310/68 R; 338/301
[58] Field of Search ............ 310/68 R, 68 D, 68 B, 310/220, 221, 222; 338/301, 302, 296, 298, 333

[56] References Cited

U.S. PATENT DOCUMENTS

| | | | |
|---|---|---|---|
| 2,570,163 | 10/1951 | Scott et al. | 338/296 X |
| 2,712,048 | 6/1955 | Huetten et al. | 338/301 |
| 3,313,963 | 4/1967 | Wren | 310/68 R |
| 3,329,878 | 7/1967 | Esch | 310/68 R |
| 4,185,263 | 1/1980 | Frey | 338/301 |
| 4,272,673 | 6/1981 | Semanaz et al. | 338/301 X |

*Primary Examiner*—Mark O. Budd
*Attorney, Agent, or Firm*—Wood, Dalton, Phillips, Mason & Rowe

[57] ABSTRACT

A rotary electric machine including a stator with a rotor journalled for rotation within the stator about an axis and carrying an electrical conductor. The resistor is mounted on the rotor and is electrically associated with the conductor. The resistor is narrow axially of the rotor and elongated radially but within the periphery of the rotor to thereby provide an axially compact rotary electric machine.

12 Claims, 4 Drawing Figures

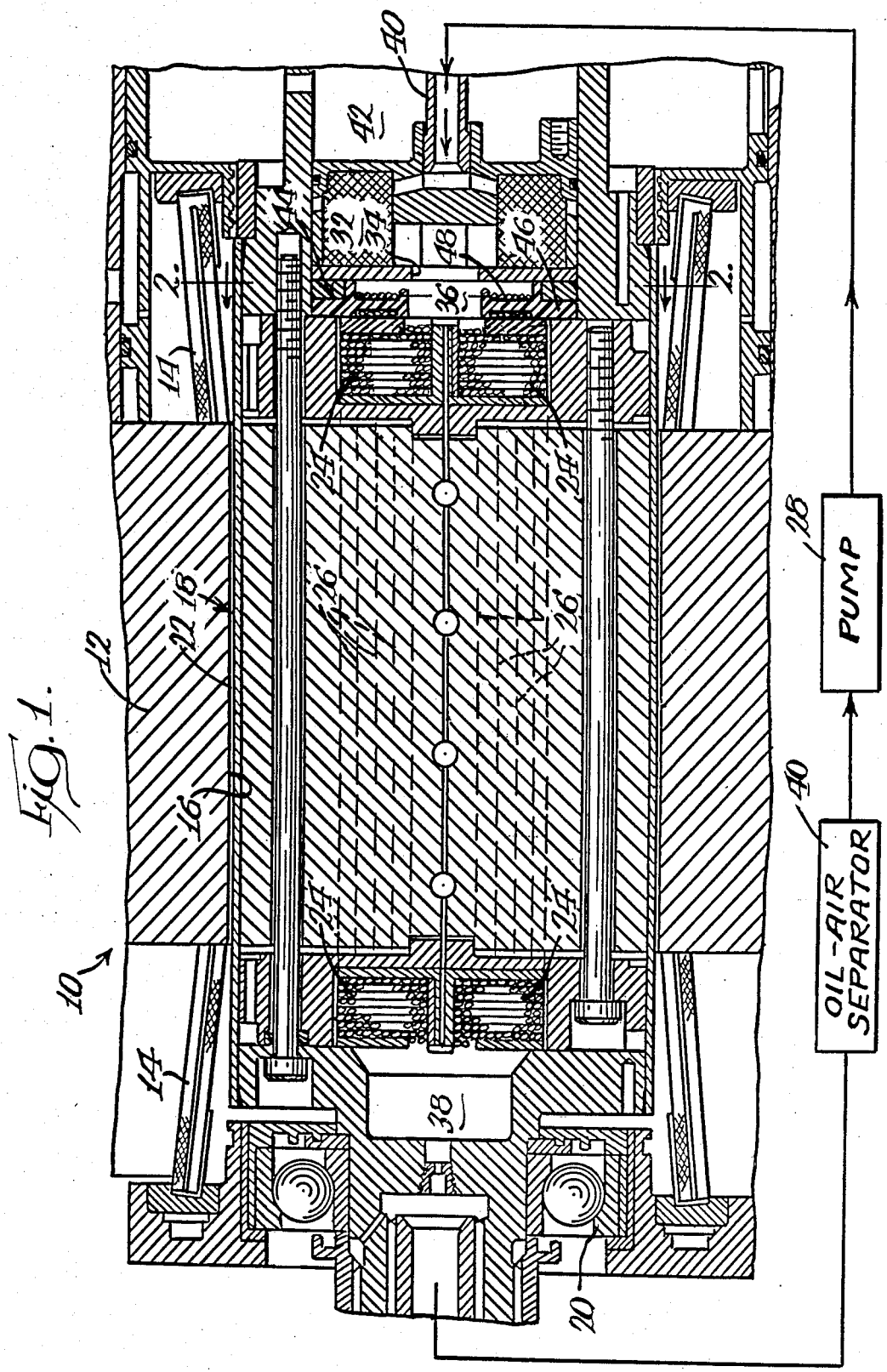

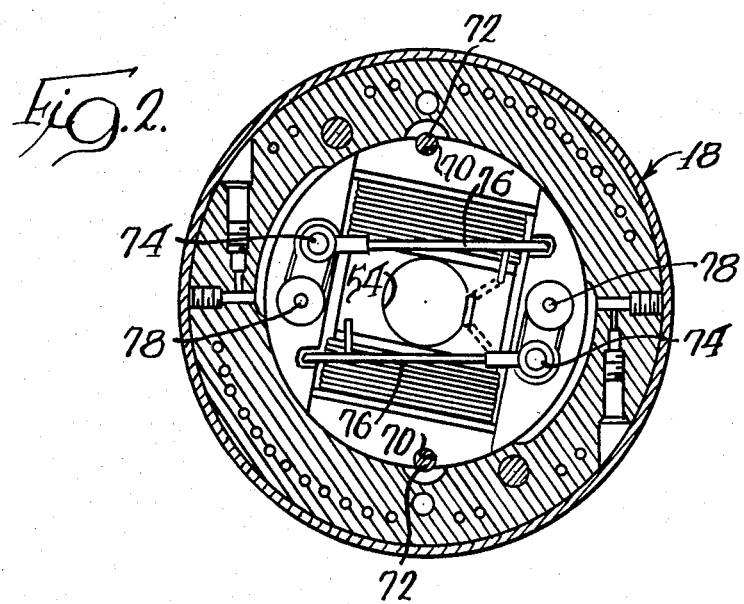

COMPACT RESISTOR ASSEMBLY FOR ROTARY ELECTRIC MACHINE

FIELD OF THE INVENTION

This invention relates to rotary electric machines, and more specifically, to a compact resistor assembly carried by the rotors of such machines.

BACKGROUND ART

Various rotary electric machines as, for example, so-called brushless generators, may have a requirement that a rotor carry a resistor connected to some part of the electric circuit carried by such rotor. In brushless generators, a field winding is energized by direct current taken from a rectifier assembly which receives its input from an exciter as is well known. As various components in the rectifier circuit initiate or cease conducting, high voltage spikes are generated which may be of sufficient magnitude to cause damage to rectifier circuit components and also cause excessive electromagnetic interference.

To avoid this potential problem, it has been common to provide a shunt resistor connected in parallel with the field winding across the output of the rectifier through which the high voltage may be readily dissipated without appreciably affecting the total power level applied to the field winding. Since such generators are intended to be brushless, it is necessary that the resistor be carried by the rotor.

Heretofore, such resistors have typically been formed by winding resistance wire about a cylindrical spool which in turn is mounted concentrically with the rotor axis, usually on the rotor shaft. The difficulty with this approach is that the spool imposes definite limits on the axial length of the rotor which in turn result in the rotor having a length that may be longer than mechanically desirable and/or may impose mechanical limitations on generator components. In general, it is desirable that such generators be as compact as possible such that increases in the axial length of the rotor results in an increase in the axial length of the overall assemblage are not desirable. Frequently, too, particularly where such generators are to be employed in aircraft, system weight is a limiting factor such that increased mechanical strength or increased weight due to the use of larger bearings or the like which may be required by rotors of relatively long axial length is to be avoided.

The present invention is directed to overcoming one or more of the above problems.

SUMMARY OF THE INVENTION

It is the principal object of the invention to provide a new and improved resistor assembly for use in a rotary electric machine wherein the resistor must be carried by the rotor.

An exemplary embodiment of the invention achieves the foregoing object in a rotary electric machine which comprises a stator with a rotor journalled for rotation within the stator about an axis and carrying an electrical conductor. A resistor is mounted on the rotor and is electrically associated with the conductor. The resistor is narrow axially of the rotor and elongated radially but within the periphery of the rotor.

According to a preferred embodiment, the resistor comprises a thin base of insulating material extending generally transverse to the rotor axis.

The resistor may further comprise windings of electrically resistive wire, each winding having a major extent located as a chord of a circle having its center on the rotor axis.

The invention contemplates that the windings be in two groups, the groups being on opposite sides of the rotor axis and preferably, the windings are bifilar windings to negate undesirable induction within the resistor.

Preferably, the conductor of the rotor is a field winding for a brushless generator and the resistor is connected in shunt relation thereto.

In a highly preferred embodiment, means are provided for cooling the field windings of the rotary electric machine and include a liquid flow path for coolant. The resistor is disposed within the rotor and within the liquid flow path.

Other objects and advantages will become apparent from the following specification taken in connection with the accompanying drawings.

BRIEF DESCRIPTION OF THE DRAWINGS

FIG. 1 is a sectional view of a rotary electric machine, specifically, a brushless generator, embodying a resistor assembly made according to the invention;

FIG. 2 is a sectional view taken approximately along the line 2—2 FIG. 1;

FIG. 3 is an elevational view of the resistor assembly apart from the rotary electric machine; and FIG. 4 is an elevational view of the resistor assembly as it would appear from the righthand side of FIG. 3.

DESCRIPTION OF THE PREFERRED EMBODIMENT

An exemplary embodiment of the rotary electric machine made according to the invention is illustrated in the drawings and with reference to FIG. 1 is seen to include a stator, generally designated 10, including a core 12 and windings, only the end turns 14 of which are shown. The core 12 has a central cylindrical aperture 16 and within the same a rotor, generally designated 18, is journalled as by a pair of bearings, only one of which is shown at 20. As is well known, the rotor 18 and the stator 10 are separated by a small air gap 22.

The rotor 18, in the embodiment illustrated, is a two pole rotor and includes field windings, the end turns of which are shown at 24 and the axial portions of which are illustrated at 26.

In the embodiment illustrated, the rotor windings are cooled by a liquid coolant, such as oil, and to this end, a pump 28 is provided for providing oil to a transfer tube 30 in fluid communication with a chamber 32 on the interior of the rotor. Fluid communication is established by the passages illustrated. Oil from the chamber 32 may pass through an aperture 34 in a spacer plate to a resistor chamber 36 which is in fluid communication with the end turns 24 of the rotor windings. Axial coolant passages along the length of the rotor are formed by the interstices between the wire making up the axial lengths 26 of the winding and at the end of the rotor opposite the transfer tube 30, there is a collection chamber 38 from which the oil may be taken and returned to the pump 28 via an air-oil separator 40.

As illustrated, the rotary electric machine is a so-called brushless generator and for the purpose of providing a current to the field windings, there is provided a conventional exciter generator (not shown) which normally would be located just to the right of the components illustrated in FIG. 1. In the usual case, the exciter generator will provide three phase alternating current which is then rectified to direct current by a full wave rectifier assembly (not shown) that typically would be housed in a chamber 42 about the transfer tube 30. Conductors (not shown in FIG. 1) extend from such rectifier assembly to the field windings.

As alluded to previously, it is desirable that there be a resistor connected in parallel or in shunt relation with the field windings to dissipate high voltage spikes such that they cannot damage circuit components. To this end, the invention contemplates the provision of a resistor assembly, generally designated 44, which is disposed in the resistor chamber 36. The resistor assembly 44 includes a thin base 46 formed of insulating material which, as seen in FIG. 1, is quite narrow in the axial direction of the rotor and which is elongated in the radial direction but totally contained within the periphery of the rotor. Windings of electrically resistive wire 48 are disposed on the base 46.

Turning now to FIGS. 2–4, inclusive, the resistor assembly 44 will be described in greater detail. The base 46 is generally planar and may be configured as a card-like bobbin on which the resistive wire 48 is wound in two groups, one being generally designated 50 and the other being generally designated 52. The base 46 includes a central aperture 54 which is centered about the axis of rotation of the rotor and which permits the flow of coolant to the rightmost end turns 24. Extending to one side of the aperture 54 are a pair of slots 56 which are spaced from one another and the wire 48, prior to application to the base 46 may be looped as at 58 and disposed in the slots 56.

As best seen in FIG. 4, just radially outwardly of the aperture 54 are shoulders 60 extending axially of the rotor. The ends of the wire 48 extending from the loop 58 are taken about the shoulders 60 and wound about the base 46 until a radially outer shoulder 62 is encountered. At this point, the windings return radially inwardly to form a double layered winding until the shoulders 60 are again encountered. Small apertures 64 sized to receive the wire 48 are located just inwardly of the shoulder 60 and the ends of the wire 48, shown at 66 and 68 are directed therethrough for ultimate connection to the rotor winding. The shoulders 60 and 62 serve to properly locate the wire 48 during the winding process, which may be performed by rotating the base 46 as a bobbin and to assure that the wires will not become dislodged during operation of the rotary electric machine, they may be potted with epoxy resin or the like.

The periphery of the base 46 is arcuate having a radius directed from the axis of rotation of the rotor 18. On opposite sides, the periphery includes radially outwardly opening locating slots 70 for purposes to be seen.

The base 46 is disposed in the resistor chamber 38 such that bolts used in securing the rotor components together or locating pins 72 are disposed in the slots 70 as best illustrated in FIG. 2. This prevents relative rotation between the base 46 and the rotor, particularly during the extreme acceleration that is encountered during start-up or shut-down of the rotary electric machine. Within the resistor chamber 36, there is provided terminals 74 to which are connected the leads 76 to the field winding of the rotor and respective ones of the ends 66 and 68 of the resistor assembly. Output leads 78 from the rectifier (not shown) are likewise connected to such terminals 74. Thus, the resistor assembly 44 is connected in shunt relation to the field windings on the output of the rectifier.

As can be seen from FIGS. 2 and 3, the major extent of the windings formed by the wire 46 are essentially straight lines which, in the geometrical sense are chords of a circle having its center on the rotational axis of the rotor 18. By utilizing this relationship, the axial length of the resistor assembly 44 is accordingly minimized.

It will also be appreciated that the nature of winding the wire 48 to form the resistor results in a bifilar winding wherein unwanted inductiveness in the two groups 50 and 52 are cancelled out. Because the base 46 is narrow and is essentially transverse to the axis of rotation of the rotor 18, axial compactness is provided. Stated another way, the axis of the bobbin defining the base 46 (extending from top to bottom) as regards winding intersects and extends across the rotational axis of the rotor.

Thus, an inexpensive, replaceable resistor assembly is provided which achieves the highly desirable object of axial compactness with no sacrifice of undue radial size. Its disposition in the resistor chamber 36 which, in turn, forms part of the flow path for the coolant, assures adequate cooling of the resistor assembly to provide a highly reliable, minimal weight and axial compact rotary electric machine.

I claim:

1. A rotary electric machine comprising:
   a stator;
   a rotor journalled for rotation within said stator about an axis and carrying an electrical conductor; and
   a resistor mounted on said rotor and electrically associated with the conductor, said resistor being narrow axially of said rotor and elongated radially but within the periphery of the rotor and extending across the axis thereof.

2. The rotary electric machine of claim 1 wherein said resistor comprises a thin, generally planar base of insulating material extending generally transverse to said axis.

3. The rotary electric machine of claim 1 wherein said resistor comprises windings of electrically resistive wire, each winding having a major extent located as a chord of a circle having its center on said axis.

4. The rotary electric machine of claim 1 wherein said resistor comprises a thin base of insulating material extending generally transverse to said axis, and windings of electrically resistive wire extending about said base, each winding having a major extent generally parallel to said base and located as a chord of a circle.

5. The rotary electric machine of claim 4 wherein said windings are in two groups, said groups being on opposite sides of said axis.

6. The rotary electric machine of claim 5 wherein said windings are bifilar windings.

7. The rotary electric machine of claim 1 wherein said conductor comprises a field winding for said rotor, and said resistor is connected in shunt relation thereto.

8. The rotary electric machine of claim 7 wherein said resistor is disposed at one end of said field winding, and means, including a liquid flow path, for cooling said field winding, said resistor being disposed in said liquid flow path.

9. A rotary electric machine comprising:
   a stator;
   a rotor journalled for rotation within said stator about an axis and having an axially elongated field winding; and a shunt resistor connected in parallel with said field windings and carried by said rotor, said resistor comprising a thin base of insulating material extending generally radially of and across said axis and transverse thereto, and a body of electrically resistive material carried by said base on both sides thereof.

10. The rotary electric machine of claim 9 wherein said electrically resistive material is in the form of wire wound about said base.

11. A rotary electric machine comprising:
a stator;
a rotor journalled for rotation in said stator about a rotational axis and having an electrical conductor; and
a resistor carried by said rotor and electrically associated with said conductor, said resistor comprising a thin, generally planar bobbin of insulating material with resistive wire wound thereabout, the axis of said bobbin intersecting and extending across said rotational axis.

12. The rotary electric machine of claim 11 wherein said resistive wire is wound on said bobbin in two groups disposed on opposite sides of said rotational axis.

* * * * *